Figure 1:
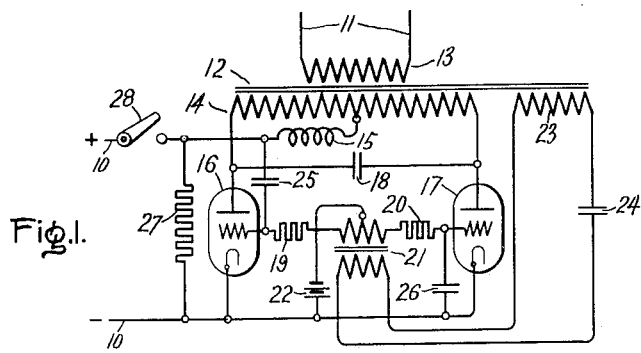

Nov. 14, 1933.   B. D. BEDFORD   1,935,431
ELECTRIC POWER CONVERTING APPARATUS
Filed March 9, 1931

Inventor:
Burnice D. Bedford,
by Charles E. Tullar
His Attorney.

Patented Nov. 14, 1933

1,935,431

UNITED STATES PATENT OFFICE 1,935,431

ELECTRIC POWER CONVERTING APPARATUS

Burnice D. Bedford, Schenectady, N. Y., assignor to General Electric Company, a corporation of New York Application March 9, 1931. Serial No. 521,094

11 Claims. (Cl. 175—363)

My invention relates to electric power converting apparatus and more particularly to such apparatus utilizing electric valves for transmitting energy from a direct current supply circuit to an alternating current load circuit.

Heretofore there have been proposed numerous arrangements including electric valves for transmitting energy from a direct current supply circuit to an alternating current load circuit. In such arrangements it is customary to excite the control grids of the electric valves from the alternating current circuit to which energy is being supplied. In certain cases however the alternating current circuit is not connected to an independent source for determining the frequency of the alternating current so that this frequency is determined by the constants of the power converting apparatus and the load circuit to which it is connected; that is, the grid excitation is obtained from the output of the apparatus itself. Such an apparatus has come to be known in the art as a self-excited electric valve inverter. In initiating the operation of a self-excited inverter, it sometimes happens that both electric valves become conductive at the same instant, due to the fact that until operation of the circuit is established, the grids of both electric valves are at the same potential. When both electric valves become conductive simultaneously, a short circuit occurs on the direct current supply circuit and the apparatus will not produce alternating current.

It is an object of my invention to provide an improved electric power converting apparatus of the type known in the art as a self-excited electric valve inverter which will overcome the above mentioned disadvantages of the arrangements of the prior art and which will be simple and reliable in operation.

It is another object of my invention to provide an improved electric power converting apparatus of the type known in the art as a self-excited electric valve inverter in which only one of the valves will be rendered positively conductive upon energization of the apparatus.

It is a further object of my invention to provide an improved electric power converting apparatus of the type known in the art as a self-excited electric valve inverter, in which there is provided an independent oscillating circuit connected across the direct current circuit which serves to initiate the oscillations of the inverter upon energization from the direct current circuit, and which cooperates with the main grid excitation circuit under normal operation of the apparatus.

It is a further object of my invention to provide an improved electric power converting apparatus of the type known in the art as a self-excited electric valve inverter in which an independent oscillating circuit connected to the direct current supply circuit serves to maintain the frequency of the alternating current output of the apparatus substantially constant, irrespective of the load on the apparatus.

In accordance with one modification of my invention, the grid of one of the electric valves of a self-excited inverter is given an impulse of positive potential upon energization of the inverter circuit by connecting a capacitor between the grid and the positive side of the direct current circuit. In order to render the grid circuits of the two electric valves symmetrical with respect to the alternating current circuit, a similar capacitor is connected between the other grid and the negative side of the direct current circuit. In accordance with another modification of my invention, an oscillating circuit comprising any desired combination of reactance, capacitance and resistance is connected across the direct current circuit and is so coupled to the grid circuits of the electric valves that upon energization of the inverter from the direct current circuit, an impulse of positive potential is impressed upon the grid of only one of the electric valves independently of the grid excitation normally derived from the output circuit of the inverter.

Figure 2:
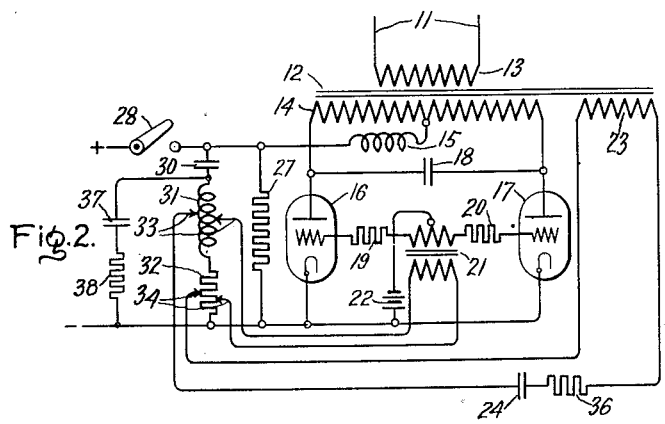
Figure 3:
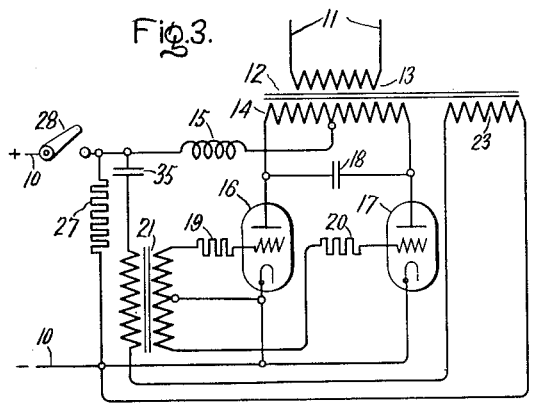
Figure 4:
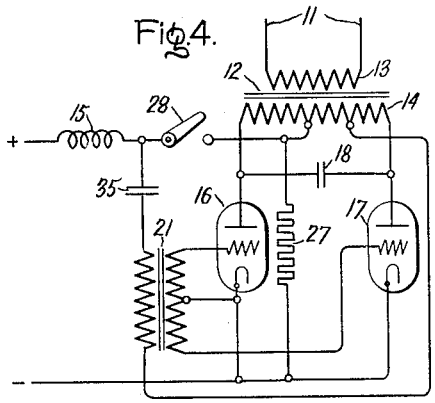

For a better understanding of my invention together with other and further objects thereof, reference is had to the following description taken in connection with the accompanying drawing, and its scope will be pointed out in the appended claims. Fig. 1 of the accompanying drawing illustrates one embodiment of my invention as applied to a self-excited inverter, while Figs. 2, 3 and 4 illustrate other embodiments of my invention, utilizing an oscillating circuit energized from the direct current circuit of the inverter and coupled to the grid circuits of the electric valves.

Referring now to Fig. 1 of the drawing, I have illustrated a self-excited inverter connected to transmit energy from a direct current supply circuit 10 to an alternating current load circuit 11. This inverter includes a transformer 12 provided with a secondary winding connected to the alternating current circuit 11, and a primary winding 14 provided with an electrical midpoint adapted to be connected to the positive direct current line through a smoothing reactor 15. The outer terminals of the winding 14 are connected to the negative direct current line through electric valves 16 and 17 respectively, while a commutating capacitor 18 is connected between the anode circuits of the valves. The valves 16 and 17 are each provided with an anode, a cathode, and a control grid and may be of any of the several types well known in the art, although I prefer to use valves of the vapor electric discharge type. The grids of electric valves 16 and 17 are connected to their common cathode circuit through current limiting resistors 19 and 20, respectively, opposite halves of the secondary winding of a grid transformer 21, and a negative bias battery 22. The primary winding of the grid transformer 21 is energized from a tertiary winding 23 of the transformer 12 through a suitable phase advancing condenser 24. It is to be understood that the above described self-excited inverter per se forms no part of my present invention, but is disclosed and claimed in United States Letters Patent No. 1,800,002 granted April 7, 1931, upon the application of Ernst F. W. Alexanderson. In order to insure that both of the electric valves 16 and 17 shall not become conductive at the same instant upon energization of the direct current circuit, a capacitor 25 is connected directly between the grid of the valve 16 and the positive side of the direct current circuit. A capacitor 26 of a capacitance equal to that of capacitor 25 is connected between the grid of the valve 17 and the negative side of the direct current circuit in order to maintain the symmetry of the grid circuits of the electric valves 16 and 17, with respect to the alternating current circuit of the apparatus. A high resistance 27 is connected across the direct current circuit to provide a discharge path for capacitor 25 when the operation of the apparatus has been interrupted. There is also provided means for deenergizing the direct current circuit of the apparatus shown conventionally as switch member 28.

The general principles of operation of the above described apparatus will be well understood by those skilled in the art or may be found set forth in detail in the above mentioned Alexanderson patent. In brief, assuming that electric valve 16 is first made conductive, current will build up in the left hand portion of the winding 14 inducing a positive potential upon the right hand terminal of the capacitor 18 and inducing a potential in the tertiary winding 23 such as to impress a positive potential upon the grid of the valve 17 at the proper instant. Commutating capacitor 18 now transfers the load current from the valve 16 to the valve 17, reversing the direction of current flow in the winding 14 and thus reversing the potential delivered to the alternating current circuit 11 and that induced in the grid winding 23. At a proper point in the cycle the potential induced in the winding 23 renders the grid of the valve 16 conductive so that the current is transferred from the valve 17 to the valve 16, and the above described cycle is repeated indefinitely. However, assuming that the switch member 28 is initially open and that the circuit is exactly symmetrical both electric valves 16 and 17 will tend to become conductive simultaneously when the switch member 28 is closed. On the other hand, if the electric valves 16 and 17 are dissimilar or there is any other lack of symmetry in the circuit, the output delivered to the circuit 11 becomes unbalanced and the operation of the apparatus as a whole, unsatisfactory. However, with the capacitor 25 connected between the grid of the valve 16 and the positive direct current line, when the switch 28 is closed a momentary positive impulse is impressed upon the grid of the valve 16, while the grid of the valve 17 remains at cathode potential. In this way the valve 16 is positively rendered conducting first and the successive half cycles of alternating current flowing in the winding 14 will effect the proper reversals of grid polarity to render the valves 16 and 17 successively conductive. On the other hand, it will be seen that if the impedance of the direct current circuit 10, which is very small as compared to that of capacitors 25 and 26, is neglected, the capacitor 25 may be considered as connected directly between the grid of the valve 16 and the negative direct current line 10 and the alternating current impedances of the two grid circuits are equal so that the normal operation of the apparatus will be symmetrical with respect to the valves 16 and 17. The operation of the apparatus may be interrupted by the opening of the switch member 28. In this condition capacitor 25 will discharge through resistor 27 and the grid circuit of the valve 16, while capacitor 26 will discharge directly through the grid circuit of valve 17. The capacitors are now in readiness to initiate the operation of the apparatus upon the subsequent closure of the switch member 28.

While my invention has been illustrated and described in connection with an inverter of the parallel type, it will be apparent to those skilled in the art that it is equally applicable to an inverter of the series type, such as that disclosed in United States Letters Patent No. 1,752,247, granted March 25, 1930, upon the application of Alan S. FitzGerald.

In Fig. 2 there is illustrated a modification of my invention in which the initial positive grid impulse for one of the electric valves is obtained from an independent oscillating circuit connected across the direct current side of the inverter. This circuit comprises any suitable combination of capacitance, reactance and resistance, such for example as a capacitor 30, a reactor 31, and a resistor 32. The primary winding of grid transformer 21 and the tertiary winding of the power transformer 12 are coupled to this oscillating circuit by means of the adjustable connections 33 and 34. In cases where the apparatus is to be connected to a high voltage direct current circuit it may be desirable to connect a capacitor 37 having a relatively large capacitance with respect to that of capacitor 30 in series with capacitor 30 in order to reduce the potential applied to the grid circuit and a resistor 38 may be connected in series with capacitor 37 to limit the initial transient current. With such an arrangement when the switch member 28 is closed, a transient occurs in this oscillating circuit which excites the grids of one of the electric valves through the grid transformer 21, thus positively rendering one of the valves conductive and at the same time holding off the other valve. After oscillation has been established in the inverter itself, energy is fed from the tertiary winding 23 to this oscillating circuit, serving to maintain it in oscillation. In certain cases it may be desirable to include an impedance such as a resistor 36 in series with the phase advancing condenser 24 in the circuit of the tertiary winding 23 in order to secure the proper phase relation between the potential of the winding 23 and that of the oscillating circuit. With this arrangement it has been found that the frequency of oscillation of the circuit comprising capacitor 30, reactor 31 and resistor 32 is substantially constant and independent of variations in load conditions, which normally affect the frequency of the output of a self-excited inverter.

In Fig. 3 there is shown a simplification of the apparatus illustrated in Fig. 2 in which the reactor 31 and resistor 32 have been replaced by the primary impedance of the grid transformer 21, thus reducing the amount of apparatus required. The operation is substantially equivalent to that described in connection with Fig. 2.

In Fig. 4 there is illustrated a further simplification of the arrangement shown in Fig. 2 in which the tertiary winding 23 of the transformer 12 has been eliminated and the independent oscillating circuit has been connected directly in series with a portion of the primary winding 14. In this arrangement the capacitor 25 is normally charged through resistor 27, but rapidly discharges through the inverter circuit upon the closure of the switch member 28 to initiate operation of the apparatus.

While I have described what I at present consider the preferred embodiments of my invention, it will be obvious to those skilled in the art that various changes and modifications may be made without departing from my invention and I therefore aim in the appended claims to cover all such changes and modifications as fall within the true spirit and scope of my invention.

What I claim as new and desire to secure by Letters Patent of the United States, is:

1. In combination, a direct current supply circuit, an alternating current load circuit, a self-excited electric valve inverter including a plurality of valves for transmitting energy therebetween, and means operable upon the energization of said inverter to render positively conductive only one of said valves.

2. In combination, a direct current supply circuit, an alternating current load circuit, a self-excited electric valve inverter for transmitting energy therebetween, said inverter including a plurality of electric valves each provided with a control grid, and means operable upon the energization of said inverter positively to impress an impulse of positive potential upon the control grid of only one of said valves.

3. In combination, a direct current supply circuit, an alternating current load circuit, a self-excited electric valve inverter for transmitting energy therebetween, said inverter including a plurality of electric valves provided with control grids and symmetrical grid circuits, and means operable upon the energization of said inverter positively to impress an impulse of positive potential upon the control grid of only one of said valves without destroying the symmetry of said grid circuits.

4. In combination, a direct current supply circuit, an alternating current load circuit, a self-excited electric valve inverter for transmitting energy therebetween, said inverter including a plurality of electric valves each provided with a control grid, a capacitor connected between the positive direct current line and the grid of one of said valves and a second capacitor connected between the grid of another valve and the negative direct current line.

5. In combination, a direct current supply circuit, an alternating current load circuit, a self-excited electric valve inverter for transmitting energy therebetween, disconnecting means interposed between said supply circuit and said inverter, said inverter including a plurality of electric valves each provided with a control grid, a capacitor connected between the positive direct current terminal of the inverter and a grid of one of said valves, a capacitor having a capacitance equal to said first mentioned capacitor connected between the grid of another valve and the negative direct current terminal of the inverter, and a high resistance discharge path for said capacitors.

6. In combination, a direct current supply circuit, an alternating current load circuit, a self-excited electric valve inverter including a plurality of electric valves for transmitting energy therebetween, means for normally controlling the conductivity of said valves, and an oscillating circuit connected to said supply circuit operable independently and positively to render conductive only one of said valves upon the energization of said inverter.

7. In combination, a direct current supply circuit, an alternating current load circuit, a self-excited electric valve inverter for transmitting energy therebetween, said inverter including a plurality of electric valves provided with control grids and a grid circuit therefor, and an oscillating circuit connected to said direct current circuit and coupled with said grid circuit.

8. In combination, a direct current supply circuit, an alternating current load circuit, a self-excited electric valve inverter for transmitting energy therebetween, said inverter including an inductive winding and a plurality of electric valves provided with control grids, an oscillating circuit connected to said direct current circuit and arranged to render positively conductive only one of said electric valves upon energization of said inverter, and means for transmitting energy from said inductive winding to said oscillating circuit to maintain it in oscillation.

9. In combination, a direct current supply circuit, an alternating current load circuit, a self-excited electric valve inverter for transmitting energy therebetween, said inverter including a transformer and a plurality of electric valves provided with control grids, an oscillating circuit connected to said direct current circuit and arranged to render positively conductive only one of said electric valves upon energization of said inverter, and connections from said oscillating circuit to a winding of said transformer whereby oscillations are sustained in said circuit.

10. In combination, a direct current supply circuit, an alternating current load circuit, a self-excited electric valve inverter for transmitting energy therebetween, said inverter including a transformer and a plurality of electric valves provided with control grids, an oscillating circuit including a winding of said transformer connected to said direct current circuit, and a grid circuit for said valves energized from said oscillating circuit whereby only a single valve is rendered positively conductive upon the energization of said direct current circuit and thereafter said valves are rendered conductive in a predetermined sequence.

11. In combination, a direct current supply circuit, an alternating current load circuit, a self-excited electric valve inverter for transmitting energy therebetween, said inverter including a transformer and a plurality of electric valves, means for normally controlling the conductivity of said valves from a winding of said transformer, an independent oscillating circuit connected to said direct current circuit and cooperating with said transformer winding initially to render positively conductive only one of said valves upon energization of said inverter, and thereafter to maintain the frequency of said inverter substantially constant irrespective of changes in load on the inverter.

BURNICE D. BEDFORD.